UNITED STATES PATENT OFFICE.

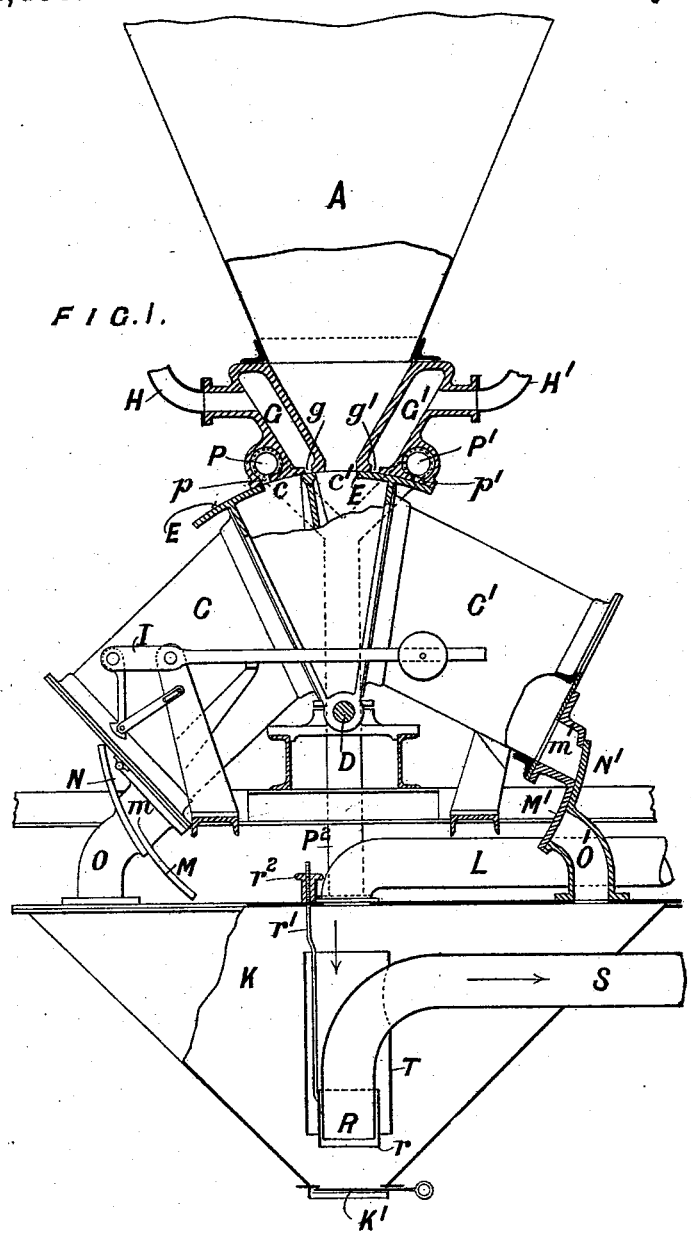

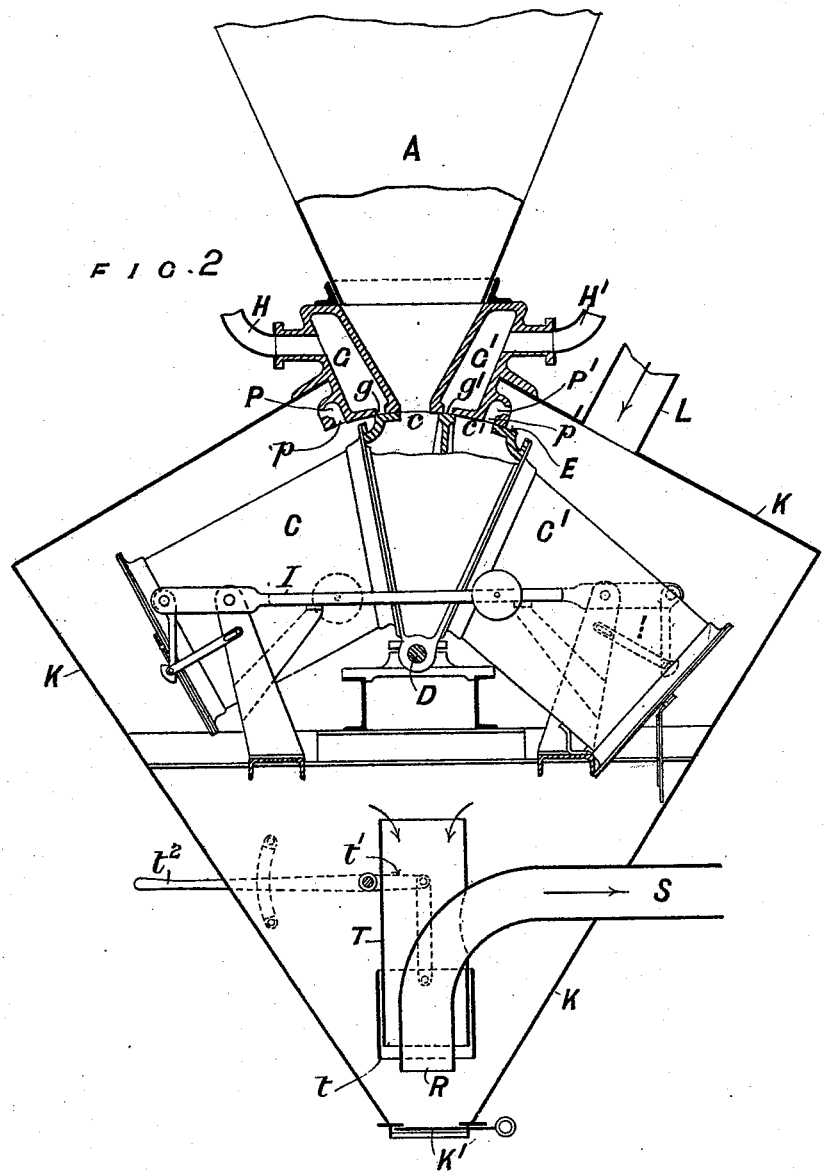

FREDERIC ELIOT DUCKHAM, OF LONDON, ENGLAND.

PNEUMATIC GRAIN-CONVEYER.

SPECIFICATION forming part of Letters Patent No. 522,458, dated July 3, 1894.

Application filed December 14, 1893. Serial No. 493,698. (No model.) Patented in India October 28, 1893, No. 263.

*To all whom it may concern:*

Be it known that I, FREDERIC ELIOT DUCKHAM, civil engineer, of Millwall Docks, London, England, have invented new and useful Improvements in Pneumatic Grain-Conveyers, (for which I have obtained Letters Patent in the following country, namely: British India, dated October 28, 1893, No. 263,) of which the following is a full, clear, and exact description.

My invention relates to apparatus for loading, unloading, and transferring, from one place to another, grain and other granular or pulverulent matters in bulk by pneumatic agency and the invention has for its object to enable the methods of working by exhaustion and by compression of the air to be combined or applied the one in continuation of the other.

Pneumatic apparatus such as that to which my present improvement relates, is described in previous Letters Patent of the United States of America, dated the 8th day of March, 1892, No. 470,555, and in an improved form in another application for Letters Patent, of even date herewith, Serial No. 493,696. Such apparatus when used for loading and unloading ships' cargoes is generally arranged on a barge or on the quay and it has heretofore only been capable of delivering below the level of the oscillating two-chambered air-lock delivery box. When, therefore, in discharging a vessel it is required to deliver in a warehouse or elsewhere at a height above, or distance from, the air-lock delivery box it has been usually necessary to employ other means of conveyance to such further height or distance. Again in loading a ship from barges, since the same apparatus is used both for loading and unloading, the air lock delivery boxes cannot be conveniently placed at a great height, and it has been necessary to employ additional means, such as bucket elevators, to raise the grain, &c., from the point at which it is delivered by the pneumatic apparatus to a height which will enable it to flow through the vessel's hatchway into the hold.

The present improvement consists in the combination, with the oscillating two-chambered air lock delivery boxes of pneumatic apparatus working by exhaustion, of means whereby the further conveyance of the matters delivered thereby is effected by a current of air under pressure, the said means comprising a closed chamber into which the air lock delivery box discharges, supplied with air under pressure and containing a nozzle with air-supply sleeve immersed in the contents of the chamber and connected to a conveying pipe leading to the point of delivery.

Reference is to be had to the accompanying drawings, forming part of this specification, wherein I have represented in—

Figure 1 a sectional elevation of the improvement and in Fig. 2 a similar view of a slight modification thereof.

Referring to Fig. 1, A is the exhausted hopper in which the grain, &c., is received from the conveying pipe of the apparatus working by vacuum and from which it passes alternately to the one or other of the twin chambers C C' of the air lock delivery box, oscillating on a horizontal axis D under the control of counterweighted detent mechanism I, the communication with the hopper A and with by-pass air passages G G' connected by pipes H H' with the upper part of the hopper, being effected through apertures $c$ $c'$ in a valve face E on the air-lock delivery box, moved by the oscillation of the delivery box beneath a valve seat surrounding the mouth of the hopper A and furnished with by-pass ports $g$ $g'$, all as described in my other application of even date herewith.

K is a closed hopper-shaped chamber into which the chambers C C' of the air-lock delivery box discharge and into which the air that was drawn off from A by the exhausting engine (or air from a special blowing engine) is forced through pipe L. The chambers C C' communicate alternately with chamber K by discharge apertures $m$ $m'$ in valve faces M M' which work over corresponding valve seats N N' on pipes O O' leading to chamber K, the valve faces being curved to an arc struck from axis D and being so arranged that the outlets from chambers C C' and the inlets to the chamber K are always closed to the external air and are only put into communication with each other when the air lock delivery box has fallen over to its extreme position. In order to establish between the chamber C or C' which is to be discharged and the chamber K the equilibrium of pressure necessary to permit the rapid flow of the matters to be delivered from the one to the other, passages P P', connected by a pipe P² with chamber K, communicate at the proper moment, through ports $p\ p'$ in the seat of the valve E, with the aperture $c$ or $c'$ of the chambers C C'.

Within the lower part of chamber K is fixed a nozzle R which leads out from the chamber K and is connected to a conveying pipe S leading to the point where the grain, &c., is to be discharged. The nozzle R is surrounded by a sleeve T of sufficiently larger diameter to provide an annular air passage between the nozzle and sleeve, the nozzle and sleeve being immersed in the grain, &c., contained in chamber K and the open upper end of the sleeve rising above the level thereof, in order to admit of the air forced into the upper part of chamber K through a pipe L connected with the delivery orifice of the exhausting engine, so that the engine works both as an exhauster and air compressor, the air thereby supplied to chamber K passing down the sleeve and carrying along with it into the nozzle R the grain, &c., as it flows down below the sleeve T. The lower end of the sleeve terminates at a certain height above the lower end of the nozzle such that a certain depth of grain, &c., will always be thus interposed in the path of the air current. The exact relative position of the sleeve and nozzle is subject to slight variation, according to the nature or condition of the grain or other matters to be conveyed, the height or distance to which it is to be conveyed, the air pressure available, and other circumstances, the effect of varying the height of the mouth of the sleeve being to vary the relative proportion of the air current to the matters carried. To enable this adjustment to be made the lower part of the nozzle as at $r$ Fig. 1 or of the sleeve as at $t$ in Fig. 2 is fitted to slide telescopically on the main part thereof and is adjusted by any convenient means, such, for example, as a screw rod $r'$ and nut $r^2$ as shown in Fig. 1 or a forked lever $t'$ pivoted to the adjustable part $t$ and working on a fulcrum in the vertical side of the chamber and operated by an adjusting lever $t^2$ outside the chamber. If it should not be required to convey the grain, &c., to a further point it may be delivered directly from the chamber K by opening a slide K' at the bottom thereof.

Referring to Fig. 2 in which the same letters indicate the same parts as in Fig. 1, the operation is precisely the same as that above described, the only structural difference being that the chamber K wholly incloses the air lock delivery boxes C C' and its counterweight mechanism. Consequently the valves M M' and seats N N' are not required, the outlets of the chambers C C' being closed by hinged flap valves, as usual, closing under external air pressure and opening under the weight of the contents of the chamber when equilibrium of pressure is established by the inlet orifices $c\ c'$ of the chambers C C' opening to the ports $p\ p'$, which, as in the other case, are in communication with chamber K.

I claim—

1. The combination, with the oscillating two-chambered air-lock delivery box having a valve-like connection with an exhausted charging hopper, of a closed chamber supplied with air under pressure and into which the chambers of the air lock delivery box are adapted to discharge, and a valve at the upper part of the air lock delivery box establishing equilibrium of pressure between the said chamber and the chambers of the delivery box only at the moment of their discharge, substantially as specified.

2. The combination, with the oscillating two-chambered air-lock delivery box having a valve-like connection with an exhausted charging hopper, of a closed chamber supplied with air under pressure and into which the chambers of the air-lock delivery box are adapted to discharge, and a valve at the upper part of the air-lock delivery box establishing equilibrium of pressure between the said chamber and the chambers of the delivery box only at the moment of their discharge, and a dipping nozzle within said chamber connected to a delivery pipe and surrounded by an air sleeve rising above the grain, &c., contained in the chamber in which both the sleeve and nozzle are immersed, substantially as specified.

3. The combination, with the oscillating two-chambered air-lock delivery box having valve-like connection with an exhausted charging hopper, of a closed chamber supplied with air under pressure, and of valves establishing communication at the required times between the closed chamber and the lower parts of the chambers of the air-lock delivery box at the same time that another valve establishes communication between the said chamber and the upper part of the said chambers of the air-lock delivery box, the valves controlling the communications of the air-lock delivery box with the charging hopper and with the closed chamber into which the air-lock delivery box discharges, being all operated by the oscillation of the delivery box under the weight of the load and under the control of counterweighted detent mechanism, as specified.

4. The combination, with a closed chamber supplied with air under pressure and into which the air-lock delivery box of pneumatic conveying apparatus working by exhaustion discharges, of a dipping nozzle within said chamber connected to a delivery pipe and surrounded by an air sleeve rising above the grain, &c., in said chamber, in which both the sleeve and nozzle are immersed, the depth of immersion of the sleeve being so much less than that of the nozzle that the grain, &c., will flow beneath the sleeve into the path of the air current, as specified.

5. The combination, with a closed chamber supplied with air under pressure and into which the air-lock delivery box of pneumatic conveying apparatus working by exhaustion discharges, of a dipping nozzle within said chamber connected to a delivery pipe and surrounded by an air sleeve rising above the grain, &c., in said chamber, the sleeve being made in two lengths whereof the lower one is fitted to slide telescopically, and means for adjusting the height of the sliding part of the sleeve relatively to the mouth of the nozzle, substantially as specified.

6. A combined pneumatic conveying apparatus working partly by exhaustion and partly by compression for conveying the same matters by the same current of air beyond the point to which they are conveyed by exhaustion, which consists of an oscillating air-lock delivery box receiving and delivering the matters conveyed by the exhaust current, a closed chamber which receives the matters delivered by the oscillating air-lock delivery box and is itself connected by a pipe with the discharge outlet of the exhausting engine working also as a compression engine, and of a nozzle within said closed chamber, connected to a delivery pipe and surrounded by an air sleeve rising above the solid contents of said chamber in which both the nozzle and sleeve are immersed, as specified.

Signed by the said FREDERIC ELIOT DUCKHAM.

FREDERIC ELIOT DUCKHAM.

In presence of—
G. F. WARREN,
17 *Gracechurch Street, London, Notary Public.*
T. W. KENNARD,
*Clerk to A. M. & Wm. Clark, Patent Agents,*
53 *Chancery Lane, London.*